United States Patent
Ori

(10) Patent No.: US 6,278,108 B1
(45) Date of Patent: Aug. 21, 2001

(54) SYNCHRONOUS LIGHT DETECTOR FOR OPTICAL SCANNING APPARATUS

(75) Inventor: Tetsuya Ori, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/438,044

(22) Filed: Nov. 10, 1999

(30) Foreign Application Priority Data

Nov. 24, 1998 (JP) .................................................. 10-332737

(51) Int. Cl.$^7$ ....................................................... H01J 3/14
(52) U.S. Cl. ......................................... 250/235; 250/201.5
(58) Field of Search ................................. 250/235, 201.5, 250/234, 216; 369/44.23; 359/216–221; 347/234, 235, 248, 250

(56) References Cited

U.S. PATENT DOCUMENTS 5,877,883 * 3/1999 Inoue et al. ........................... 359/196

FOREIGN PATENT DOCUMENTS

61172113 A    8/1986 (JP) .

* cited by examiner

*Primary Examiner*—Que T. Le
(74) *Attorney, Agent, or Firm*—Snider & Associates; Ronald R. Snider

(57) ABSTRACT

A synchronous light detector for an optical scanning apparatus comprises a cylindrical lens 14 and a light-receiving device 15. The cylindrical lens 14 is disposed between an imaging lens 8 of the optical scanning apparatus and the light-receiving device 15 so as to have a generator direction parallel to a scanning direction of a light beam. The light-receiving surface of the light-receiving device 15 is disposed at a position shifted from a paraxial image point P in the direction orthogonal to the scanning plane of the light beam by a predetermined distance Δ along the optical axis direction of the light-receiving device 15 when the deflecting point of the light beam caused by a polygon mirror 6 is taken as an object point. As a consequence, the synchronous signal of the optical scanning can be detected correctly even when there is a flaw or dirt on the light-receiving surface.

6 Claims, 1 Drawing Sheet

SYNCHRONOUS LIGHT DETECTOR FOR OPTICAL SCANNING APPARATUS

RELATED APPLICATIONS

This application claims the priority of Japanese Patent Application No. 10-332737 filed on Nov. 24, 1998, which is incorporated herein by reference.

BACKGROUND OF THE INVENTION

1. Field of the Invention

The present invention relates to a synchronous light detector for attaining a scanning timing of a light beam in an optical scanning apparatus equipped with light-deflecting means constituted by a rotary polygon mirror or the like.

2. Description of the Prior Art

Optical scanning apparatus, which are apparatus for optically scanning a surface to be scanned by deflecting a light beam, have been known as apparatus for writing optical information onto the surface and reading out information therefrom.

Conventionally known as such an optical scanning apparatus is one employing a system in which light-deflecting means deflects a light beam, thus deflected light beam is focused like a spot by an imaging lens onto a surface to be scanned, and the surface is optically scanned therewith. Such an optical scanning apparatus uses a rotary polygon mirror, for example, as the light-deflecting means.

The rotary polygon mirror is made of a right-regular prism whose side faces form a mirror surface. When the rotary polygon mirror is rotated while a light beam is incident on the mirror surface along a fixed direction, the light beam reflected by the mirror surface is periodically deflected. Thus deflected light beam is focused like a spot by the imaging lens onto the surface to be scanned. As the light beam is deflected, the spot of the light beam moves on the surface to be scanned, thereby optically scanning the latter.

Meanwhile, the above-mentioned conventional optical scanning apparatus is equipped with a synchronous light detector for attaining a timing for optical scanning. This synchronous light detector is configured such that the light beam deflected by the rotary polygon mirror toward its optical scanning area by way of the imaging lens is detected as synchronous light by a light-receiving device, so as to attain synchronization of a scanning start timing of the light beam.

Also, a cylindrical lens having a refracting power only in the direction orthogonal to the scanning plane of the light beam is disposed between the imaging lens and the light-receiving device, while the deflecting point of the light beam caused by the rotary polygon mirror and the imaging point on the light-receiving surface of the light-receiving device are made optically conjugate with each other within a plane orthogonal to the scanning direction of the light beam upon attaining synchronization of the scanning start timing of the light beam (as disclosed in Japanese Patent Publication No. 7-43462, for example).

However, when a point on the light-receiving surface of the light-receiving device is disposed at the position optically conjugate with the deflecting point of the light beam caused by the rotary polygon mirror, while the light beam forms an image on the light-receiving surface of the light-receiving device; if there is a flaw on the light-receiving surface of the light-receiving device or dirt is attached thereto, and the image is formed at the location where this flaw or dirt exists, then the light beam is scattered on the light-receiving surface, whereby synchronization signals may not be detected correctly. As a consequence, there has been a possibility that it becomes hard to attain synchronization of the scanning start timing of the light beam.

SUMMARY OF THE INVENTION

In view of the circumstances mentioned above, it is an object of the present invention to provide a synchronous light detector for an optical scanning apparatus, which can correctly detect a synchronization signal for optical scanning, even when there is a flaw on the light-receiving surface of the light-receiving device or dirt is attached thereto, by enhancing its light spot area on the light-receiving device.

For achieving the above-mentioned object, the synchronous light detector in accordance with the present invention is a synchronous light detector for an optical scanning apparatus in which a light beam is deflected by light-deflecting means, thus deflected light beam is focused like a spot by an imaging lens onto a surface to be scanned, and the surface is scanned with the spot; the synchronous light detector attaining an optical scanning start timing by detecting as synchronous light the light beam deflected by the light-deflecting means toward an optical scanning area;

the synchronous light detector comprising:
  a light-receiving device for receiving the light beam as the synchronous light by way of the imaging lens; and
  a cylindrical lens disposed between the imaging lens and the light-receiving device;
  the cylindrical lens being disposed so as to have a generator direction thereof parallel to a scanning direction of the light beam;
  a light-receiving surface of the light-receiving device being disposed at a position shifted from a paraxial image point by a predetermined distance in an optical axis direction of the light-receiving device within a plane orthogonal to the scanning direction of the light beam when a deflecting point of the light beam caused by the light-deflecting means is taken as an object point.

In the synchronous light detector having such a configuration, the light beam is converged at least by the cylindrical lens along a direction orthogonal to its scanning plane. Since the light-receiving surface of the light-receiving device is disposed as being shifted from the paraxial image point of the light beam by the predetermined distance in the optical axis direction of the light-receiving device within the plane orthogonal to the scanning direction, a linear image elongated along the direction orthogonal to the scanning direction of the light beam can be obtained on the light-receiving surface. As a consequence, even when the light-receiving device has a flaw or dirt is attached thereto, the light beam can be detected at a location free of the flaw and dirt, whereby the synchronous signal can be detected correctly.

Preferably, the light-receiving surface of the light-receiving device is disposed so as to satisfy the following conditional expression:

$$0.1f < |\Delta| < 0.3f$$

where
  $\Delta$ is the distance between the paraxial image point and the light-receiving surface of the light-receiving device; and
  f is the focal length of the cylindrical lens.

If the value of the distance Δ exceeds the upper limit of the above-mentioned conditional expression, then the length of the linear image on the light-receiving surface becomes equivalent to or greater than the diameter of the light-receiving surface, whereby the accuracy in detection of the synchronous signal may lower. If the value of the distance Δ is less than the lower limit of the above-mentioned conditional expression, on the other hand, then the image of the light beam on the light-receiving surface has a size nearly identical to that of the paraxial image point. In this case, if there is a flaw on the light-receiving surface or dirt is attached thereto, and the image is positioned at the location where the flaw or dirt exists, the light beam may be scattered on the light-receiving surface, so that the synchronous signal may not be detected correctly.

Preferably, the imaging lens is an fθ lens.

Preferably, a return lens for returning the light beam from the imaging lens so as to direct the light beam to the light-receiving device is disposed between the imaging lens and the surface to be scanned.

Preferably, the imaging lens has a refracting power in a main scanning direction of the light beam alone.

The synchronous light detector is used in a laser printer, a scanner, or a copier, for example.

DESCRIPTION OF THE PREFERRED EMBODIMENTS

In the following, an embodiment of the synchronous light detector for an optical scanning apparatus in accordance with the present invention will be explained in detail with reference to the accompanying drawings.

Figure 1:
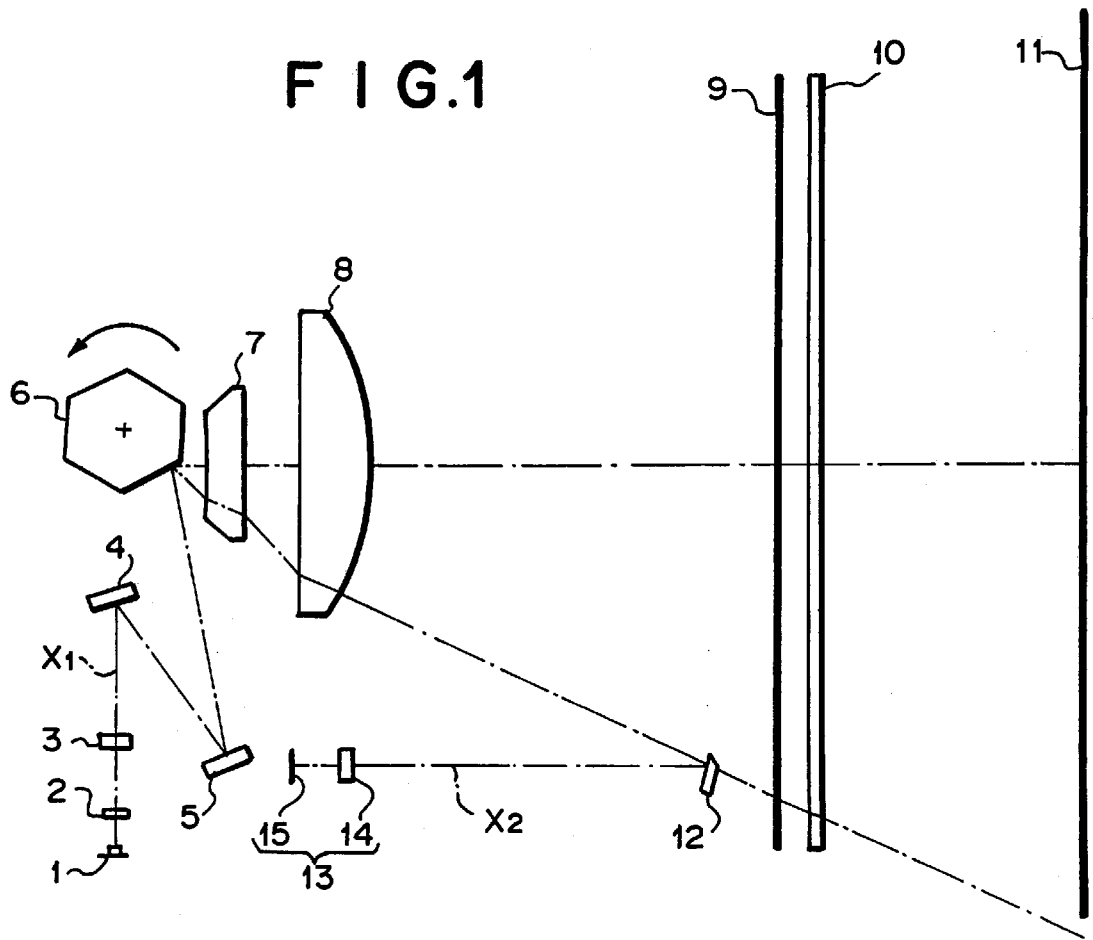
FIG. 1 is a schematic plan view of an optical scanning apparatus equipped with the synchronous light detector in accordance with the present invention.
Figure 2:
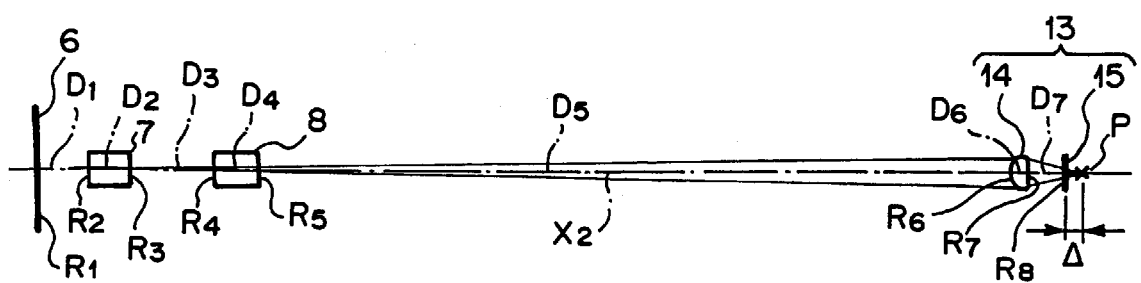
FIG. 2 is a schematic side view of the synchronous light detector in accordance with the present invention.

FIG. 1 is a schematic plan view of an optical scanning apparatus equipped with the synchronous light detector in accordance with the present invention, whereas FIG. 2 is a schematic side view of the synchronous light detector in accordance with the present invention.

Though FIG. 1 linearly represents the optical path of the light beam reflected by a plane mirror 9, the optical path of the light beam reflected by the plane mirror 9 is actually bent in the depth direction of the paper. FIG. 2 shows a vertical sectional view in part of the synchronous light detector shown in FIG. 1, in which the return mirror 12 is omitted, whereas the optical path of the light beam reflected by the return mirror 12 is represented without bending.

In the optical scanning apparatus in accordance with the present invention, as shown in FIG. 1, on the optical path $X_1$ of the light beam emitted from a semiconductor laser 1 acting as a light source, a collimator lens 2, a cylindrical lens 3, and a pair of mirrors 4, 5 are successively disposed toward a polygon mirror 6 acting as a light-deflecting device. Also, successively from the polygon mirror 6 toward a surface 11 to be scanned, a pair of imaging lenses 7, 8, the plane mirror 9, and a cylindrical lens 10 are disposed.

Though the semiconductor laser 1 is used as the light source in this embodiment, any device can be used as the light source as long as it can emit a light beam. Also, though the polygon mirror 6 made of a right-regular hexagonal prism whose side faces form a mirror surface is used as the light-deflecting device, any device can be used as the light-deflecting device as long as it can deflect the light beam.

The light beam emitted from the semiconductor laser 1 is turned into a parallel luminous flux by the collimator lens 2. The resulting parallel luminous flux is converged by the cylindrical lens 3 in the vertical direction (the direction orthogonal to the main scanning plane) in order to correct the wobbling of the polygon mirror, and is made incident on the mirror surface of the polygon mirror 6, so as to form an image.

The light beam reflected by the mirror surface of the polygon mirror 6 is focused like a spot on the surface 11 by the imaging lenses 7, 8 via the plane mirror 9 and the cylindrical lens 10.

The polygon mirror 6 is adapted to rotate counterclockwise in FIG. 1 by means of a rotary driving device such as a motor (not depicted). As the polygon mirror 6 rotates, the light beam is deflected, whereby its beam spot scans over the surface 11 (from the lower side toward the upper side in FIG. 1, which direction is referred to as "main scanning direction," whereas the plane swept with the light beam is referred to as "main scanning plane" in this specification).

Also, when sub-scanning is effected in a direction orthogonal to the main scanning plane, the optical scanning can be carried out over the whole surface 11 to be scanned. The sub-scanning is effected, for example, by moving the surface 11 in the direction orthogonal to the main scanning direction.

Preferably, each of the imaging lenses 7, 8 is an fθ lens. In this case, optical scanning can be performed uniformly over the whole area along the main scanning direction. On the other hand, the cylindrical lens 10 can eliminate pitch fluctuations in optical scanning in the sub-scanning direction, whereby the wobbling of the polygon mirror 6 can be corrected.

Meanwhile, the optical scanning apparatus is equipped with a synchronous light detector 13 for detecting as synchronous light the light beam deflected by the polygon mirror 6 toward the surface 11 to be scanned, so as to attain an optical scanning start timing.

In the optical scanning apparatus shown in FIG. 1, the return mirror 12 for reflecting the light beam deflected by the polygon mirror 6 toward the surface 11 to be scanned is disposed on the imaging lens 8 side of the plane mirror 9, whereas the synchronous light detector 13 is disposed on the optical path $X_2$ of the light beam reflected by the return mirror 12. Since the return mirror 12 is provided, the synchronous light detector 13 can be disposed in a space on the side where the imaging lenses 7, 8 are located, whereby the optical scanning apparatus can be made compact.

If there is a space enough for placing the synchronous light detector 13 in the vicinity of the surface 11 to be scanned, then the return mirror 12 is unnecessary.

A cylindrical lens 14 in the synchronous light detector 13 is disposed such that its generator direction is parallel to the main scanning direction of the light beam as shown in FIG. 2, and has no power within a plane parallel to the main scanning direction of the light beam. As a consequence, within the main scanning plane, due to the converging action of the imaging lenses 7, 8, the light beam forms a point-like image on the light-receiving surface of a light-receiving device 15.

On the other hand, the light-receiving surface of the light-receiving device 15 is disposed at a position shifted from a paraxial image point P by a predetermined distance Δ toward the cylindrical lens 14 within a plane orthogonal to the main scanning direction when the deflecting point of the light beam caused by the polygon mirror 6 is taken as an object point.

As a consequence, a linear image elongated along the direction orthogonal to the main scanning plane of the light beam can be obtained on the light-receiving surface of the light-receiving device 15.

Though the light-receiving surface of the light-receiving device 15 is disposed on the cylindrical lens 14 side of the paraxial image point P, it may be disposed on the side of the paraxial image point P opposite the cylindrical lens 14.

It is preferred that the position where the light-receiving surface is disposed satisfy the following conditional expression:

$$0.1f < |\Delta| < 0.3f$$

where

Δ is the distance between the paraxial image point and the light-receiving surface; and f is the focal length of the cylindrical lens.

It is further preferred that the following conditional expression:

$$0.15 f < |\Delta| < 0.3f$$

be satisfied.

When the light-receiving surface of the light-receiving device 15 is disposed at a position defined by the above-mentioned conditional expressions, a linear image elongated along the direction orthogonal to the main scanning direction of the light beam can reliably be obtained on the light-receiving surface of the light-receiving device 15. As a consequence, even when there is a flaw on the light-receiving surface or tiny dirt is attached thereto, the light beam can be detected in other light-receiving surface areas, whereby the reliability of the synchronous signal can be enhanced.

Preferably, each of the imaging lenses 7, 8 has a refracting power in the main scanning direction of the light beam alone. When the imaging lenses 7, 8 have such a configuration, the light beam converged by the cylindrical lens 14 of the synchronous light detector 13 can have a spot length which is elongated to a certain extent in the direction orthogonal to the main scanning plane. If the imaging lenses 7, 8 are configured so as to have a refracting power in the direction orthogonal to the main scanning direction of the light beam as well, on the other hand, the light beam once widened in the direction orthogonal to the main scanning direction of the light beam by the imaging lenses 7, 8 will be converged by the cylindrical lens 14, whereby the length of the linear image on the light-receiving surface will decrease.

EXAMPLES

In the following, the configuration of the synchronous light detector 13 for an optical scanning apparatus in accordance with the present invention will specifically be explained with reference to Examples 1 and 2.

In Examples 1 and 2, each of the imaging lenses 7, 8 is a cylindrical lens having a refracting power in the main scanning direction alone. Also, the lenses and like are disposed as shown in FIG. 2.

Example 1

Table 1 shows the radius of curvature R (mm) of each lens surface, the center thickness of each lens and the air space between neighboring lenses (hereinafter collectively referred to as "axial surface space") D (mm), and the refractive index $N_d$ and Abbe number $v_d$ of each lens at d-line in the optical scanning apparatus using the synchronous light detector 13 in accordance with Example 1 (within a plane orthogonal to the main scanning direction).

Also, the lower part of Table 1 shows the focal length f of the cylindrical lens 14, the imaging position (the distance thereto from the surface of the cylindrical lens 14 on the light-receiving device 15 side; ditto for the following), and the distance Δ between the paraxial image point P and the light-receiving surface of the light-receiving device 15.

Here, in Table 1, the axial surface space D between the imaging lens 8 and cylindrical lens 14 indicates the distance along the optical path returned by the return mirror 12.

As can be seen from Table 1, the distance Δ between the paraxial image point P and the light-receiving surface of the light-receiving device 15 is 5.43 mm, thereby satisfying the above-mentioned conditional expressions.

TABLE 1

| Surface | R | D | $N_d$ | $v_d$ |
|---|---|---|---|---|
| 1 (Polygon surface) | ∞ | 16.65 | | |
| 2 (Image lens) | ∞ | 12.92 | 1.72825 | 28.3 |
| 3 | ∞ | 26.82 | | |
| 4 (Image lens) | ∞ | 14.76 | 1.72825 | 28.3 |
| 5 | ∞ | 249.30 | | |
| 6 (Cylindrical lens) | 10.5 | 5.00 | 1.49023 | 57.5 |
| 7 | ∞ | 14.50 | | |
| 8 (Light-receiving device) | ∞ | | | | f = 21.66 mm, Image position: 19.93 mm, Δ = 5.43 mm (= 0.25 × f)

Example 2

Table 2 shows the radius of curvature R (mm) of each lens surface, each axial surface space D (mm), and the refractive index $N_d$ and Abbe number $v_d$ of each lens at d-line in the optical scanning apparatus using the synchronous light detector 13 in accordance with Example 2 (within a plane orthogonal to the main scanning direction).

Also, the lower part of Table 2 shows the focal length f of the cylindrical lens 14, the imaging position, and the distance Δ between the paraxial image point P and the light-receiving surface of the light-receiving device 15.

Here, in Table 2, the axial surface space D between the imaging lens 8 and the cylindrical lens 14 indicates the distance along the optical path returned by the return mirror 12.

As can be seen from Table 2, the distance Δ between the paraxial image point P and the light-receiving surface of the light-receiving device 15 is 3.10 mm, thereby satisfying the above-mentioned conditional expressions.

TABLE 2

| Surface | R | D | $N_d$ | $v_d$ |
|---|---|---|---|---|
| 1 (Polygon surface) | ∞ | 16.65 | | |
| 2 (Image lens) | ∞ | 12.92 | 1.72825 | 28.3 |
| 3 | ∞ | 26.82 | | |
| 4 (Image lens) | ∞ | 14.76 | 1.72825 | 28.3 |
| 5 | ∞ | 249.30 | | |
| 6 (Cylindrical lens) | 9.5 | 5.00 | 1.49023 | 57.5 |
| 7 | ∞ | 14.50 | | |
| 8 (Light-receiving device) | ∞ | | | | f = 19.60 mm, Image position: 17.60 mm, Δ = 3.10 mm (= 0.16 × f)

The synchronous light detector 13 is applicable to various optical scanning apparatus such as laser printers, scanners, copiers, and the like, for example.

Due to the configuration mentioned above, the synchronous light detector for an optical scanning apparatus in accordance with the present invention can yield effects as explained in the following.

Since the light-receiving surface of the light-receiving device is disposed so as to be shifted from the paraxial image point of the light beam by a predetermined distance in the optical axis direction of the light-receiving device within the plane orthogonal to the main scanning direction, a linear image elongated along the direction orthogonal to the scanning plane of the light beam can be obtained on the light-receiving surface.

As a consequence, even when the light-receiving device has a flaw or dirt is attached thereto, the light beam can be detected at a location free of the flaw and dirt, whereby the synchronous signal can be detected correctly.

Also, when a predetermined conditional expression defining the position where the light-receiving device is disposed is satisfied, a linear image elongated in the direction orthogonal to the scanning plane of the light beam can reliably be obtained on the light-receiving device.

What is claimed is:

1. A synchronous light detector for an optical scanning apparatus in which a light beam is deflected by light-deflecting means, thus deflected light beam is focused like a spot by an imaging lens onto a surface to be scanned, and said surface is scanned with said spot; said synchronous light detector attaining an optical scanning start timing by detecting as synchronous light the light beam deflected by said light-deflecting means toward an optical scanning area;

said synchronous light detector comprising:

a light-receiving device for receiving said light beam as said synchronous light by way of said imaging lens; and a cylindrical lens disposed between said imaging lens and said light-receiving device;

said cylindrical lens being disposed so as to have a generator direction thereof parallel to a scanning direction of said light beam;

a light-receiving surface of said light-receiving device being disposed at a position shifted from a paraxial image point by a predetermined distance in an optical axis direction of said light-receiving device within a plane orthogonal to the scanning direction of said light beam when a deflecting point of said light beam caused by said light-deflecting means is taken as an object point.

2. A synchronous light detector according to claim 1, wherein said light-receiving surface of said light-receiving device is disposed at a position satisfying the following conditional expression:

$$0.1f < |\Delta| < 0.3f$$

where $\Delta$ is the distance between the paraxial image point and the light-receiving surface of the light-receiving device; and f is the focal length of the cylindrical lens.

3. A synchronous light detector according to claim 1, wherein said imaging lens is an f$\theta$ lens.

4. A synchronous light detector according to claim 1, wherein a return lens for returning said light beam from said imaging lens so as to direct said light beam to said light-receiving device is disposed between said imaging lens and said surface to be scanned.

5. A synchronous light detector according to claim 1, wherein said imaging lens has a refracting power in a main scanning direction of said light beam alone.

6. A synchronous light detector according to claim 1, wherein said synchronous light detector is used in at least one of a laser printer, a scanner, and a copier.

* * * * *